United States Patent [19]

Long et al.

[11] 4,365,711
[45] Dec. 28, 1982

[54] VIDEO CASSETTE STORAGE AND SHIPPING CONTAINER APPARATUS

[76] Inventors: Jerry M. Long, 382 Riverside Ave., Ben Lomond, Calif. 95005; James A. Womack, 957 Verona, Livermore, Calif. 94550

[21] Appl. No.: 107,176

[22] Filed: Dec. 26, 1979

Related U.S. Application Data

[63] Continuation-in-part of Ser. No. 1,227, Jan. 5, 1979, abandoned.

[51] Int. Cl.³ ............................................. B65D 43/16
[52] U.S. Cl. .................................... 206/387; 206/1.5;
220/306; 220/337; 220/339; 220/326
[58] Field of Search ................. 206/387, 1.5; 220/326, 220/306, 337, 339

[56] References Cited

U.S. PATENT DOCUMENTS

| | | | |
|---|---|---|---|
| 976,165 | 11/1910 | Gray | 206/1.5 |
| 1,774,543 | 9/1930 | Babbitt | 220/326 |
| 3,175,853 | 3/1965 | Gilbertson | 220/326 |
| 3,485,408 | 12/1969 | Benesch | 220/326 |
| 3,858,749 | 1/1975 | Sellzy et al. | 220/326 |
| 4,011,940 | 3/1977 | Neal et al. | 206/387 |
| 4,054,206 | 10/1977 | Kobayashi et al. | 206/387 |
| 4,078,657 | 3/1978 | Schurman | 206/387 |
| 4,102,452 | 7/1978 | Sato et al. | 206/387 |
| 4,153,178 | 5/1979 | Weavers | 206/387 |

FOREIGN PATENT DOCUMENTS 641938  8/1962  Italy .................................. 220/326

*Primary Examiner*—Joseph Man-Fu Moy
*Attorney, Agent, or Firm*—Claude A. S. Hamrick

[57] ABSTRACT

A video cassette packaging device including a single molded plastic part 10 having four living hinges 28, 50, 72 and 74 which allow the part to be folded along such hinges to provide a container having two push-button type latches 14 and 16 which are resiliently held in the locked position by a single biasing element 12. The latching components 14 and 16 automatically engage the closure portion 18 of the container as it is closed about a cassette and urge the closure portion toward its open position when the two latching buttons are simultaneously depressed. The exterior of the container is configured to be aesthetically pleasing while at the same time having provisions for receiving mailing labels and for matingly interacting with storage racks presently on the market.

10 Claims, 7 Drawing Figures

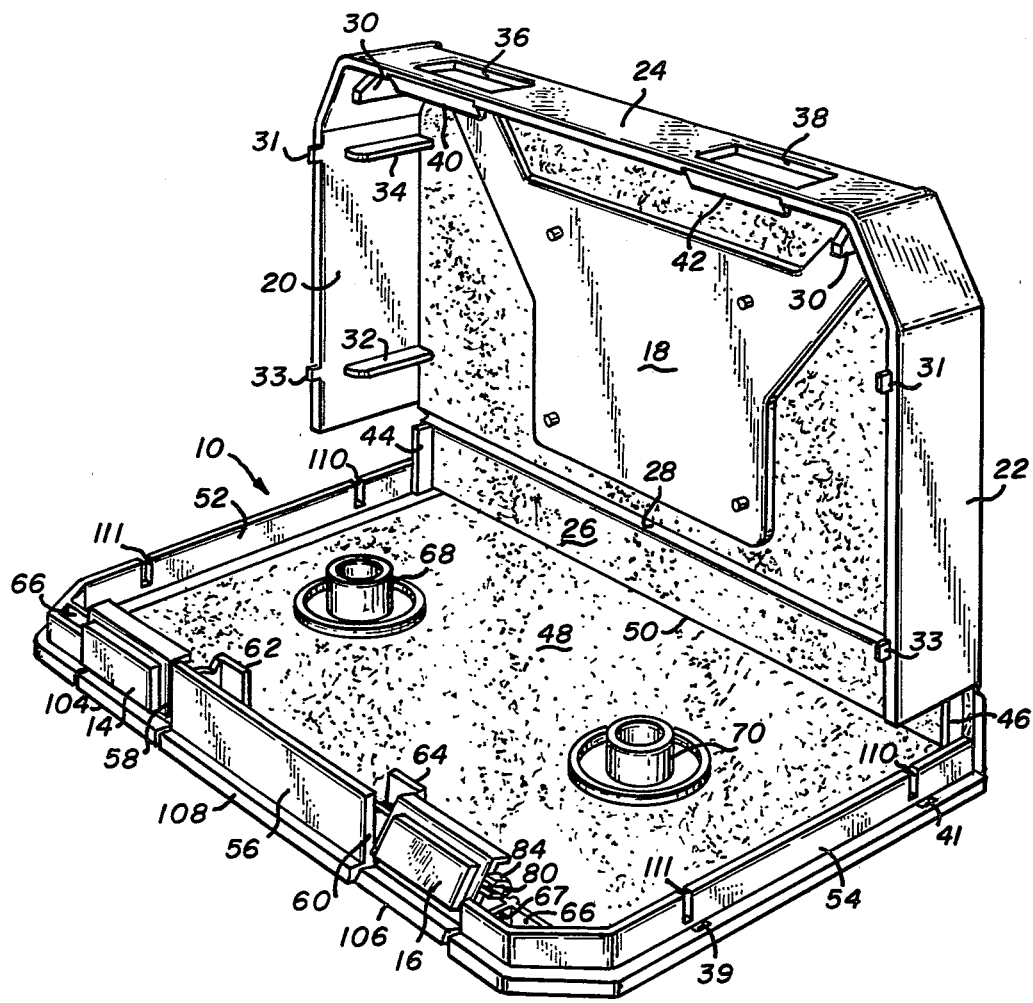
Fig_1

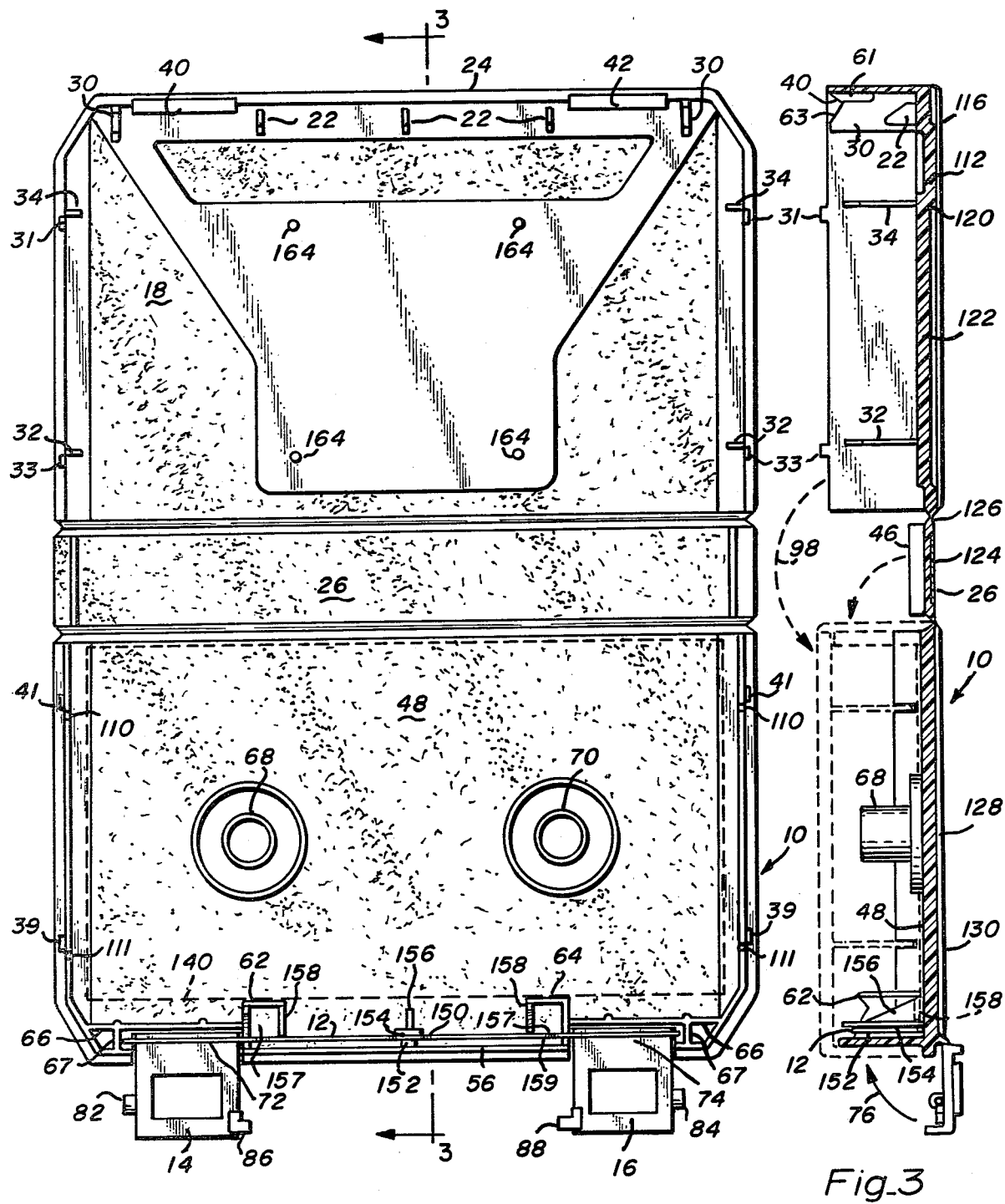
Fig_2
Fig_3

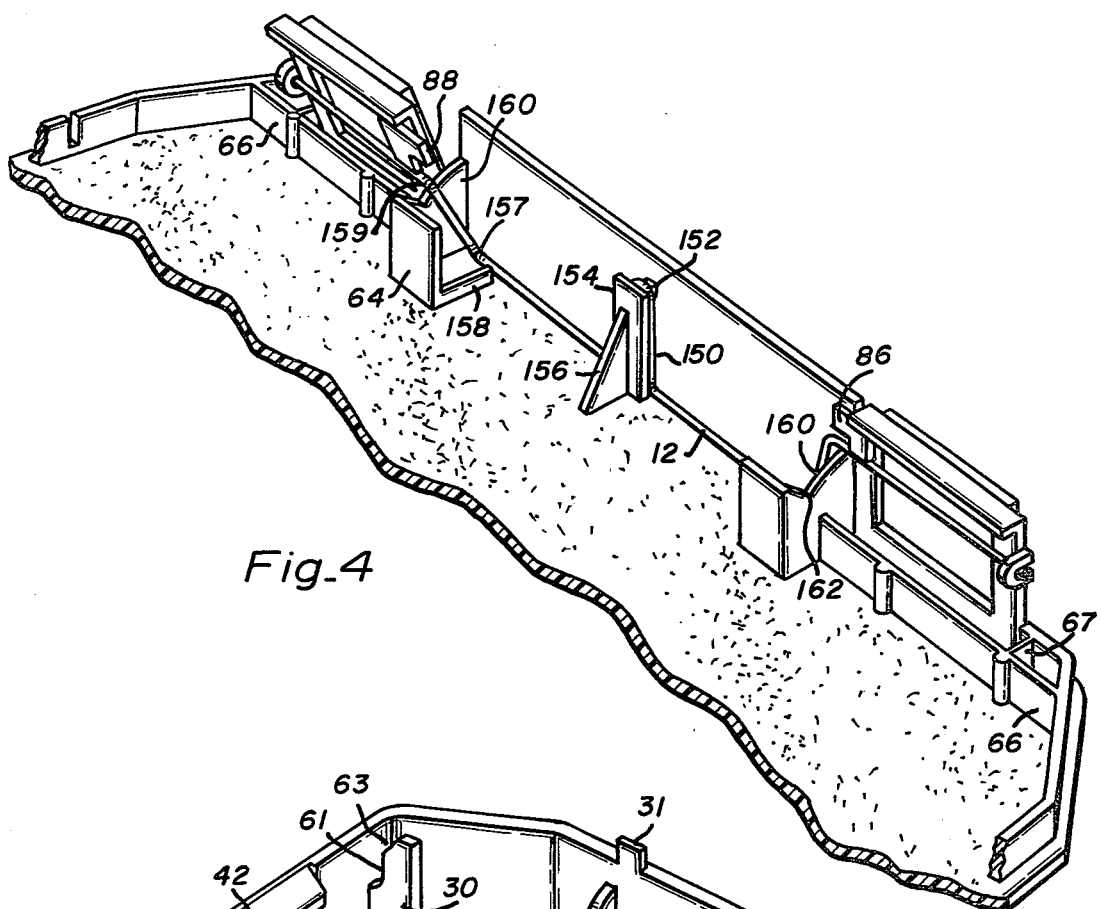
Fig_4
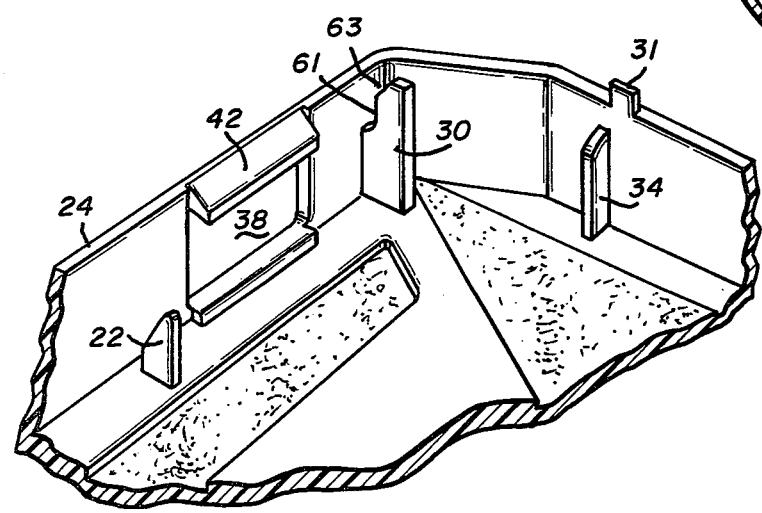
Fig_5
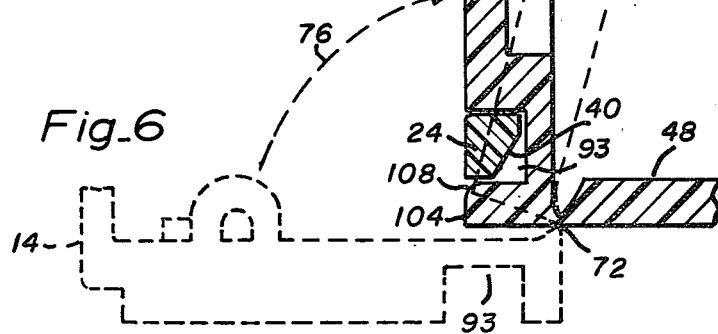
Fig_6

VIDEO CASSETTE STORAGE AND SHIPPING CONTAINER APPARATUS

CROSS REFERENCES TO RELATED APPLICATIONS

The instant application is a continuation-in-part application of co-pending patent application Ser. No. 1,227 filed Jan. 5, 1979 now abandoned. Also related to the instant application is co-pending design patent application Ser. No. 1,377 filed Jan. 5, 1979.

BACKGROUND OF THE INVENTION

1. Field of the Invention

The present invention relates generally to container apparatus for video tape cartridges and more particularly, to such a container which is molded in a single piece and requires only the addition of a single spring to complete its assembly.

2. Description of the Prior Art

Although various containers have been provided in the past for housing tape cassettes, cartridges, reels, etc., (see for example U.S. Pat. Nos. 3,876,071 and 4,011,940) those devices which are attractive enough to be used for home video cassette storage are typically not suited for use as shipping containers in that they do not comply with the requirements of the U.S. Mail Department, or, on the other hand, those that do comply with the requirements for shipping containers are not suitable for display in the home. In addition, prior art designs have either been very difficult to mold or if easy to mold required multi-step assembly operations.

SUMMARY OF THE PRESENT INVENTION

It is therefore a principal object of the present invention to provide a one-piece plastic part which can be combined with a single resilient element to provide an all-purpose container for video cassettes.

Another object of the present invention is to provide a video cassette container having dual latching mechanisms which must be disengaged simultaneously in order to allow the container to be opened.

Still another object of the present invention is to provide a video cassette container which when closed can withstand severe shock forces without opening.

Briefly, the present invention consists of a single molded plastic part having four living hinges which allow the part to be folded along such hinges to provide a container having two push-button type latches which are resiliently held in the locked position by a single biasing element. The latching components automatically engage the closure portion of the container as it is closed about a cassette and urge the closure portion toward its open position when the two latching buttons are simultaneously depressed. The exterior of the container is configured to be aesthetically pleasing while at the same time having provisions for receiving mailing labels and for matingly interacting with storage racks presently on the market.

Among the many advantages of the present invention is that it requires a minimum of labor for assembly, is easily operable and quite durable. Another advantage of the present invention is that it may be shipped through the mails without requiring further packaging.

These and other advantages of the present invention will no doubt become apparent to those skilled in the art after having read the following detailed description of the preferred embodiments which are illustrated in the several figures of the drawing.

IN THE DRAWING

FIG. 1 is a perspective view showing a video cassette container in accordance with the present invention in its open configuration;

FIG. 2 is a plan view of the unfolded container showing its interior surfaces;

FIG. 3 is a cross section taken along the line 3—3 of FIG. 2;

FIG. 4 is a perspective view showing the inner front wall of the base portion of the present invention;

FIG. 5 is a perspective view showing a corner portion of the inner front wall of the closure portion of the present invention;

FIG. 6 is a cross-sectional diagram illustrating operation of the push-button latching mechanism of the present invention.

DETAILED DESCRIPTION OF THE PREFERRED EMBODIMENTS

Figure 7:
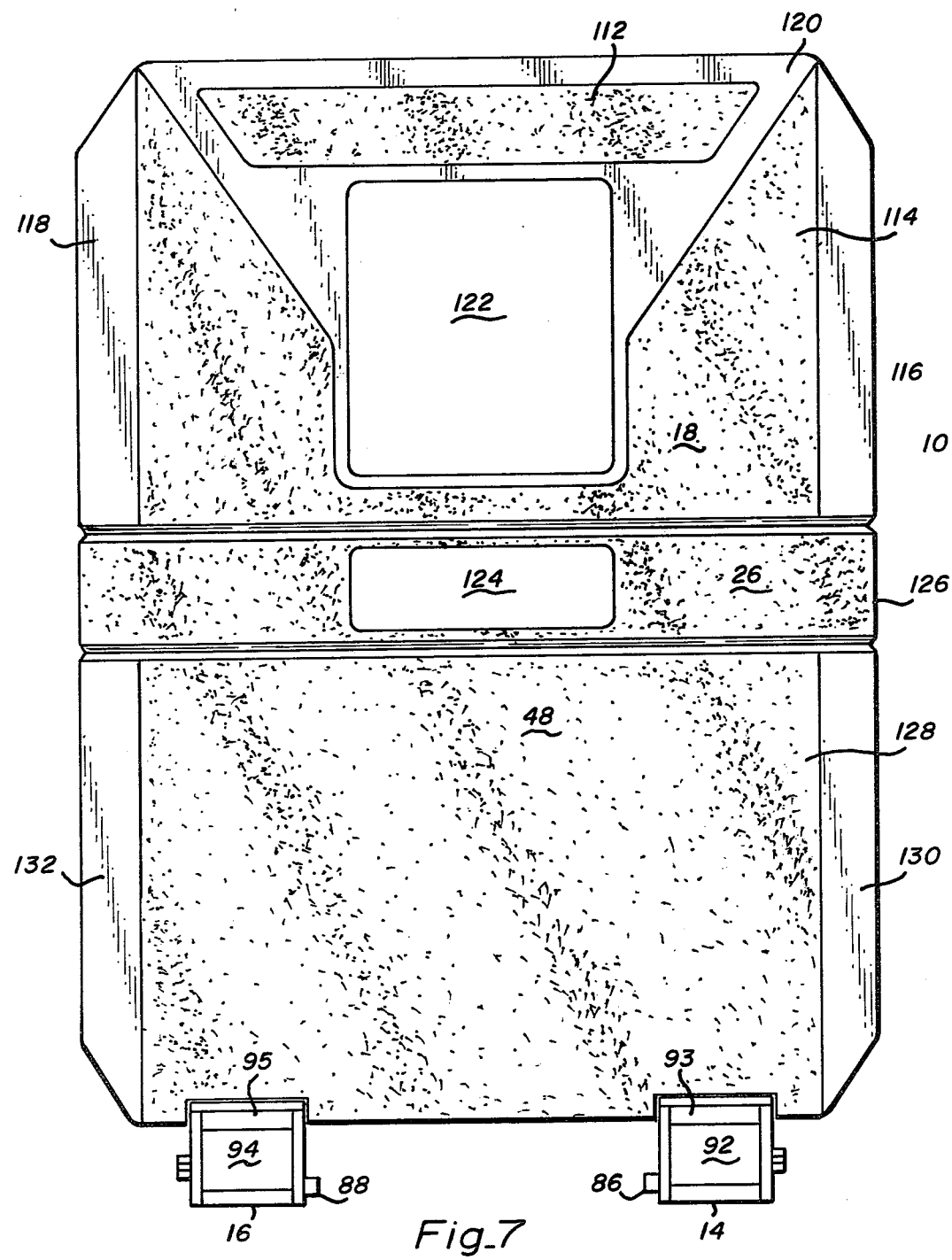
FIG. 7 is a plan view of the unfolded container showing its exterior surfaces.

Referring now to FIG. 1 of the drawing, there is shown a video cassette container in accordance with the present invention comprised of a singlepiece molded part 10. The molded part 10 includes a closure portion 18 having left, right and front side walls 20, 22 and 24, respectively, integrally formed to the edges thereof with the fourth side of closure portion 18 being integrally secured to a rear side portion 26 by a living hinge 28. Formed on the inside of the side walls 20 and 22 are ribs 32 and 34, and emanating from the outer edges of side walls 20 and 22 are projections 31 and 33. The front wall 24 is provided with rectangular apertures 36 and 38, bosses 30 and beveled edge sections 40 and 42 which will be explained in more detail below.

Rear wall 26 has formed on its interior surface at each end flanges 44 and 46 which provide dust protection when the container is in its closed position as will be further explained below. The base portion 48 is affixed to rear portion 26 by a second living hinge 50 and has formed in its upper surface side walls 52 and 54, and a front wall 56. Slots 58 and 60 are provided in front wall 56 for receiving the push buttons 14 and 16 as will be further described below. Slots 110 and 111 are provided in side walls 52 and 54 to receive ribs 32 and 34 upon closure of the container. Depressions 39 and 41 are provided in base portion 48 to the outer side of side walls 52 and 54 for receiving projections 31 and 33 upon closure of the container. Extending from the back side of wall 56 and upwards from base 48 are L-shaped cassette alignment and retaining flanges 62 and 64. Also extending from the back side wall 56 and upwards from base 48 are corner strengthening braces 66 and 67. Formed in the upper surface of base portion 48 are a pair of hub capture elements 68 and 70 which mate with the tape containing hubs of a cassette to be stored.

Referring now to FIGS. 2 and 3 which illustrate the part 10 in the configuration in which it is molded, it will be noted that push-buttons 14 and 16 are initially laid out parallel to the base 48 and hingedly attached thereto by the living hinges 72 and 74. In order to position the push-buttons 14 and 16 in their locking disposition, they are merely rotated upwardly as illustrated by the arrow 76. Upon upward rotation of the push-buttons, stops 86 and 88 will contact front wall 56. Slight pressure is then required to force the push-buttons through slots 58 and 60 to position stops 86 and 88 on the inner side of front wall 56. Spring 12 is located along the inner side of front wall 56 and is held in operative position by a series of projections from base 48 and front wall 56. As depicted in FIG. 4, the central portion of spring 12 has a U-shaped configuration 150 that rises over projection 152 which emanates from the inner side of front wall 56. Projection 152 is formed with a flat plate 154 for retaining the U-shaped portion 150 of spring 12 in proper position along the inner side of front wall 56, and triangular support member 156, which projects up from base 48, is provided for added strength. The remaining spring support projections are mirror images of each other about the central spring support point at projection 152; it therefore being understood that the following description of the left hand spring support projections will apply equally to the right hand spring support projections.

The U-shaped portion 150 of spring 12 rises over projection 152, descends behind plate 154, makes a right angle turn therebehind and proceeds along the inner front edge formed by the junction of base 48 and front side wall 56. Spring 12 is held in place along front wall 56 by passing through a narrow space formed between projection 158 and front wall 56. Thereafter, spring 12 is formed with another right angle turn 157 proximate projection 158 and rises along the junction of L-shaped flange 64 with front wall 56. Upon passing the top of L-shaped flange 64, spring 12 makes another right angle turn 159, passes under stop 88 and traverses the back of push-button 16. The end 80 of spring 12 then passes through eyelet 84 formed on push-button 16.

Once the buttons 14 and 16 are rotated into their upright positions, they will be held in that position by spring 12. Note that the stiffness of spring 12 and the interference with the rear side of front wall 56 by stops 86 and 88 combine to retain the buttons in their upright position and prevent them from rotating forward. However, note that the ends of spring 12 are free to flex rearwardly so as to permit the buttons to rotate rearwardly about their living hinges. As illustrated in FIG. 4, when push-button 16 is rotated rearwardly, spring 12 will rotate in a torsional mode about right angle 157, with projection 158 retaining the base portion of spring 12 along the junction of base 48 with front wall 56. The upper portion of spring 12 proximate right angle 159 will then circumscribe an arc about the central point at right angle 157. To accomodate this arcing movement, the upper edge 160 of L-shaped flange 64 is formed in a concentric arc which terminates at point 162 and then rises to the height of the L-shaped flange. Point 162 and the rising edge thus act as a stop on the rearward motion of the push-button.

Referring now to FIGS. 5, 6 and 7 of the drawing, it will be noted that the buttons 14 and 16 include rectangular projections 92 and 94, respectively, which extend outwardly relative to the plane of front wall 56 illustrated at 96 in FIG. 6. As a result, when closure portion 18 is rotated forwardly as indicated by the arrow 98 in FIG. 3, the beveled projections 40 and 42 will interfere with the projections 92 and 94, respectively, and thus prevent full closure until the buttons are rotated rearwardly. In order to facilitate the rotation of the buttons rearwardly, the upper edges of projections 92 and 94 are contacted by projections 40 and 42 respectively, thereby allowing wall 24 to cam over projections 92 and 94 and rotate the buttons 14 and 16 rearwardly as it moves into its closed position. As member 18 rotates into its closed position, the projections 92 and 94 become aligned with the apertures 36 and 38 in wall 24 and the button mechanisms 14 and 16 are thereby caused by spring 12 to move forwardly into apertures 36 and 38 and lockingly engage wall 24 and retain it in its closed position. Slots 93 and 95 are formed below projections 92 and 94 respectively to receive projections 40 and 42 respectively upon closure. When the apparatus is in its closed configuration, projections 40 and 42, by virtue of their residence in slots 93 and 95 respectively, act as keepers to retain the apparatus in its closed configuration.

Similarly, by depressing the projections 92 and 94 rearwardly and out of engagement with the apertures 36 and 38 of wall 24, the closure member can be rotated upwardly into its open position as illustrated in FIG. 1. In order to assist the opening process, the button mechanisms 14 and 16 are provided with toe-like flanges 104 and 106 respectively which are aligned with the edge flange 108 of base portion 48 and differ therefrom only in that the upper outer edge is rounded, as indicated in FIG. 6. As will be noted from FIG. 6, as member 14 is rotated in the direction indicated by arrow 90, toe flange 104 will engage the beveled edge 40 of wall 24 and urge it upwardly as the projection 92 clears opening 36. This pop-up action makes it quite easy to then lift the cover member 18 into the open position illustrated in FIG. 1.

As most clearly shown in FIGS. 1 and 3, the walls 52 and 54 also include notches 110, and 111. The purpose of these notches is to receive the ribs 32 and 34 as closure portion 18 is rotated into its closed position and thereby square up the rear portion 26 relative to base 48. Upon closure, projections 31 and 33 protrude into depressions 39 and 41 respectively to aid in providing a strong structure. To insure that the front wall 24 of closure member 18 properly aligns with the front wall 56 of base portion 48 and to provide added strength to the corners of the container, bosses 30 are formed proximate the outer corners of the inner surface of wall 24. As depicted in FIG. 5, the upper portion of the lateral edge of each boss 30 proximate wall 24 is formed to create a slot 61 therebetween. Slot 61 functions to receive and hold side wall 56 upon closure of the container. The upper surface of boss 30 may be beveled 63 to guide side wall 56 into slot 61 upon closure. To provide further structural integrity to the container, such that it is strong enough to serve as a shipping container, braces 66 and 67 are formed to give added support to the front corners and to front wall 56. Brace 66 is sufficiently spaced behind front wall 56 to allow boss 30 to project therebetween and engage front wall 56 in slot 61 upon closure. The rearward edge of boss 30 is formed to contact brace 66 upon deformation of a corner, such as might be caused by rough handling or droppage of the device in the mail, whereby brace 66 provides rearward support to boss 30 as well as the corner and side walls of base 48. An added measure of support for front wall 56 is provided by projections 22, which are formed in closure portion 18 along the inner front edge of wall 24 to engage front wall 56 upon closure of the container. Note also that as the ribs 32 and 34 enter the notches 110 and 111, the flanges 44 and 46 move into place immediately adjacent to the inside surfaces of walls 52 and 54. This effectively provides a tight dust-free closure at the rear edges of the container.

Referring again to FIGS. 2, 3 and 7, it will be noted that the surface areas 112 and 114 are depressed below the surface areas 116 and 118, the area 120 is further depressed below areas 112 and 114 and the area 122 is still further depressed. In addition, for aesthetic effects, the surface areas 112 and 114 are textured. The intended purpose of area 122 is to accomodate a suitable mailing label.

In the back portion 26, the exterior surface area 124 is also smooth and recessed beneath the textured surface 126 so as to provide an area for receiving an identifying label. Surface area 128 of base portion 48 is also textured and recessed beneath the level of edge portions 130 and 132 in a manner similar to that in the upper portion 118.

In addition to the obvious aesthetic value of the raised edge portions 116, 118, 130 and 132, the interior edges of these surfaces also function as a means for mating with retainers in the slots of a storage rack of the type disclosed in co-pending U.S. Design Application Ser. No. 947,421, filed Oct. 2, 1978. These surfaces, of course, also tend to protect the label area 122 from scuffing during the handling of the container. As indicated in FIG. 2, most of the interior flat surfaces of the container are also textured for aesthetic effect.

In use a cassette is placed in the position indicated by the dashed lines 140 of FIG. 1 with the spools thereof aligned with and engaged by the hub capture elements 68 and 70, and the front edge aligned with the L-shaped alignment projections 62 and 64. As cover portion 18 is rotated into its closed position, the sides of the cassette are engaged by the ribs 32 and 34. As a result, the cassette is snuggly received within the container. It should also be noted that the hub-capture elements 68 and 70 frictionally engage the tape-containing spools of the cassette and thereby tend to prevent rotation of the spools during handling of the container. The side ribs 32 and 34 as well as the projections 62 and 64 also serve to provide an element of crush protection for the contained cassette. To provide further protection for an enclosed cassette, closure portion 18 may be formed with projections 164 which contact the surface of the enclosed cassette and prevent rattling movement of the cassette within the container. Since these projections also act as standoffs which separate the cassette from the wall of the container they also serve to provide a degree of protection against crushing forces which might be applied to the container.

As can be seen from the foregoing description, the instant invention can be molded in a single piece of plastic and requires only the addition of spring 12 to complete assembly. By virtue of its configuration, the closed container is both aesthetically pleasing and strong enough to be used as a mailing carton.

Although the present invention has been described above with reference to particular preferred embodiments, it is contemplated that alterations and modifications will become apparent to those skilled in the art after having read this disclosure. It is therefore intended that the appended claims be interpreted as covering all such alterations and modifications as fall within the true spirit and scope of the invention.

What is claimed is:

1. Cassette storage and shipping container apparatus comprising:
    a unitary molded plastic body including
        a closure portion including keeper means formed on one side thereof,
        a back portion joined at one edge to said closure portion by an integrally formed first living hinge means formed on another side of said closure portion opposite said one side,
        a base portion joined to another edge of said back portion opposite said one edge by an integrally formed second living hinge means, and
        a first locking portion joined to an edge of said base portion other than the edge thereof defined by said second hinge means by an integrally formed third living hinge means, said first locking portion including a button-like projection extending outwardly therefrom and forming a push button when said first locking portion is rotated about said third hinge means and into a position substantially normal to said base portion, said first locking portion further including another projection disposed between said button-like projection and said third hinge means and extending outwardly therefrom, and
    a resilient means engaged with said base portion and operative to hold said first locking portion in said substantially normal position while biasing same outwardly relative to said base portion and about said third hinge means, whereby when said back portion is rotated about said second hinge means into a position substantially normal to said base portion, and said closure portion is rotated about said first hinge means into a closed position in overlying generally parallel relationship to said base portion, said button-like projection lockingly engages said keeper means and secures said closure portion in said closed position thereby forming a closed chamber for containing a cassette, and whereby when a force is applied to said button-like projection causing it to rotate about said third hinge means and out of locking engagement with said keeper means, said another projection engages an edge of said closure portion and urges it away from said base portion thereby allowing said apparatus to be opened.

2. Cassette storage and shipping container apparatus as recited in claim 1 and further comprising a second locking portion joined to said base portion by a fourth integrally formed living hinge means, and wherein said resilient means is also operative to bias said second locking portion outwardly relative to said base portion and about said fourth hinge means such that it likewise lockingly engages said keeper means when said closure portion is in said closed position.

3. Cassette storage and shipping container apparatus as recited in claim 1 and further comprising hub-capture means affixed to said base portion for engaging the tape spool hubs of a cassette contained within said container apparatus.

4. Cassette storage and shipping container apparatus as recited in claim 2 wherein said resilient means comprises a single torsional spring also engaged with said locking portion and being fixed against rotation at one point and free to rotate at its point of engagement with said locking portion.

5. Cassette storage and shipping container apparatus as recited in claim 1 having a rib-like boss member formed in said closure portion proximate each outer corner thereof, each of said boss members having a slot formed therein to matingly engage an edge of said base portion upon closure of said apparatus whereby the corners of said apparatus are strengthened against impact.

6. Cassette storage and shipping container apparatus as recited in claim 5 having brace members formed in said base portion to strengthen the corners thereof, said brace members being formed to engage the side of said boss member opposite said slot upon closure of said apparatus whereby said brace members provide added support to said boss members in strengthening the corners of said apparatus.

7. Cassette storage and shipping container apparatus as recited in claim 1 having standoff projections formed to project from said closure portion for contacting the surface of an enclosed cassette to separate said cassette from said closure portion of said apparatus, thereby eliminating rattling of said cassette within said apparatus and providing protection against crushing forces.

8. Cassette storage and shipping container apparatus comprising:
   a unitary molded plastic body including
      a closure portion,
      a back portion joined at one edge to said closure portion by an integrally formed first living hinge means;
      a base portion joined to another edge of said back portion opposite said one edge by an integrally formed second living hinge means; and
      a first locking portion joined to an edge of said base portion other than the edge thereof defined by said second hinge means by an integrally formed third living hinge means;
      said closure portion including keeper means projecting from an edge thereof other than the edge defined by said first hinge means, said first locking portion including a button-like projection extending outwardly therefrom when said first locking portion is rotated about said third hinge means and into a position substantially normal to said base portion;
   a resilient means engaged with said base portion and operative to bias said first locking portion outwardly relative to said base portion and about said third hinge means, whereby when said back portion is rotated about said second hinge means into a position substantially normal to said base portion, and said closure portion is rotated about said first hinge means into a closed position in overlying generally parallel relationship to said base portion, said button-like projection lockingly engages said keeper means and secures said closure portion in said closed position thereby forming a closed chamber for containing a cassette, and
   means for urging said closure portion away from said base portion when said locking portion is disengaged;
   a second locking portion joined to said base portion by a fourth integrally formed living hinge means, and wherein said resilient means is also operative to bias said second locking portion outwardly relative to said base portion and about said fourth hinge means such that it likewise lockingly engages said keeper means when said closure portion is in said closed position;
   said closure portion having a generally rectangular top surface, two side walls emanating from the side edges of said top and being normal to said first living hinge and a front wall emanating from the remaining edge and being normal to said side walls, said keeper means being formed in said front wall;
   said back portion being generally rectangular in shape and having two ribs rising from the surface thereof, each rib being located proximate an edge of said back portion that is not formed with a living hinge;
   said base portion having a generally rectangular bottom surface, two side walls emanating from the side edges of said bottom and being normal to said second living hinge and a front wall emanating from the remaining edge which is normal to said side walls, said front wall having slots formed therein permitting the interposition of said locking portions therethrough;
   two ribs formed to project from the inner surface of each of said side walls of said closure portion;
   two slots formed in each of said side walls of said base portion;
   said side walls of said closure portion and said side walls of said base portion being formed to stand proximate one another in a generally overlapping relationship upon closure of said container whereby said ribs of said side walls of said closure portion matingly engage said slots formed in said side walls of said base portion;
   said ribs of said back portion being formed to stand proximate to said overlapped side walls upon closure of said container; and
   said front wall of said closure portion being formed to stand proximate said front wall of said base portion in a generally overlapping relationship such that said keeper means will lockingly engage said locking portion upon closure of said container.

9. Cassette storage and shipping container apparatus as recited in claim 8 wherein a first rib like brace member is formed to project normally from the inner surface of said front wall of said base portion proximate each corner thereof, and
   a second rib like brace member is formed to project normally from the inner surface each of said side walls of said base portion proximate the corner formed between said side wall and said front wall of said base portion,
   said brace members being formed to matingly intersect perpendicularly with each other at each of said corners of said base portion, whereby said corners are strengthened against deformation.

10. Cassette storage and shipping container apparatus as recited in claim 9 wherein portions of said brace members cooperate with portions of said front wall and said side wall to provide female recepticals,
   said front wall of said closure portion having rib-like boss members projecting from the inner surface thereof proximate each corner, said boss members being formed with slots separating portions of said boss members and said front wall such that upon closure of said container, said front wall of said base portion will be matingly engaged within said slots,
   said boss members also being formed such that portions thereof will penetrate in mating engagement with said female recepticals upon closure of said container.

* * * * *